United States Patent [19]

Caridis et al.

[11] 4,325,295
[45] Apr. 20, 1982

[54] APPARATUS FOR PREPARING FRENCH FRIED POTATOES

[75] Inventors: Andrew A. Caridis, Foster City; Clark K. Benson, Millbrae; Steven G. Leary, San Mateo; Arthur A. Nilsen, San Francisco, all of Calif.

[73] Assignee: Heat and Control, Inc., San Francisco, Calif.

[21] Appl. No.: 226,469

[22] Filed: Jan. 19, 1981

Related U.S. Application Data

[62] Division of Ser. No. 13,461, Feb. 21, 1979, Pat. No. 4,269,861.

[51] Int. Cl.$^3$ .............................................. A47J 37/00
[52] U.S. Cl. ...................................... 99/339; 99/404; 99/407; 99/443 C; 99/447
[58] Field of Search ................ 99/339, 404, 407, 447, 99/443 C, 403; 432/121; 426/438, 441, 637

[56] References Cited

U.S. PATENT DOCUMENTS

| | | | |
|---|---|---|---|
| 3,050,404 | 8/1962 | Traisman | 426/441 |
| 3,085,020 | 4/1963 | Backinger | 426/637 |
| 3,244,538 | 4/1966 | Kaehler | 426/438 |
| 3,282,197 | 11/1966 | Smith | 99/339 |
| 3,397,993 | 8/1968 | Strong | 426/441 |
| 3,627,535 | 12/1971 | Davidson | 426/441 |
| 3,649,305 | 3/1972 | Wilder | 426/441 X |
| 3,947,241 | 3/1976 | Caridis | 432/121 |
| 4,167,137 | 9/1979 | Remmen | 99/404 |

FOREIGN PATENT DOCUMENTS

| | | | |
|---|---|---|---|
| 900266 | 5/1972 | Canada | 99/438 |
| 2724280 | 12/1977 | Fed. Rep. of Germany | 99/403 |
| 2354741 | 1/1978 | France | 99/403 |
| 639895 | 7/1950 | United Kingdom | 99/339 |

*Primary Examiner*—Billy J. Wilhite
*Attorney, Agent, or Firm*—Flehr, Hohbach, Test, Albritton & Herbert

[57] ABSTRACT

A process for preparing french fried potatoes for freezing and subsequent finish frying to resemble closely french fried potatoes prepared directly from fresh potatoes, in which after completion of the preliminary potato treatment steps of peeling, trimming, cutting into french fry size strips, and washing, the strips are then treated with hot oil for a brief period, and that step is repeated following at least one treatment of the potato strips to a hot, (300° to 400° F.) high velocity process vapor of high moisture content (60 to 65%) and following a final oil treatment, exposing the strips to a hot, dry process vapor for reducing the gross weight about 30%. This process produces a pre-fried potato product with an oil content of about 3 to 7%.

4 Claims, 2 Drawing Figures

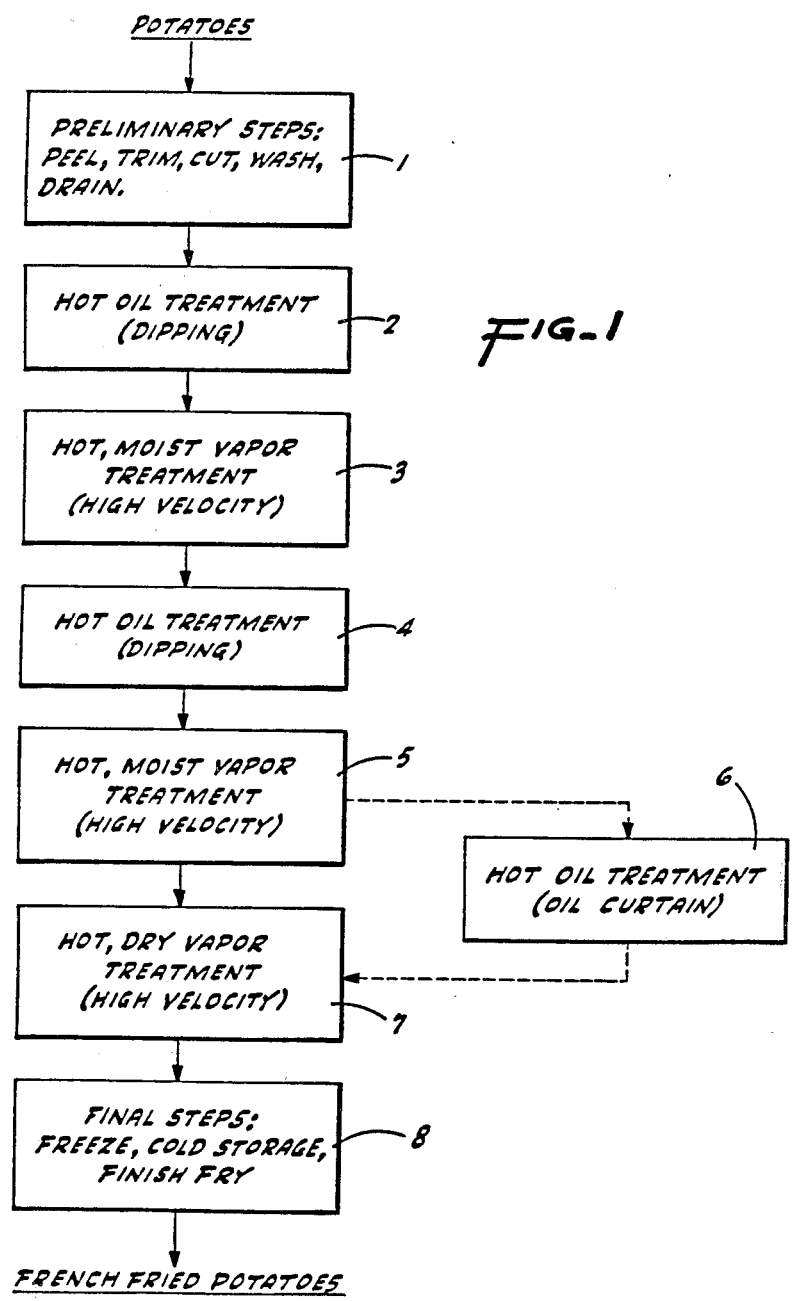

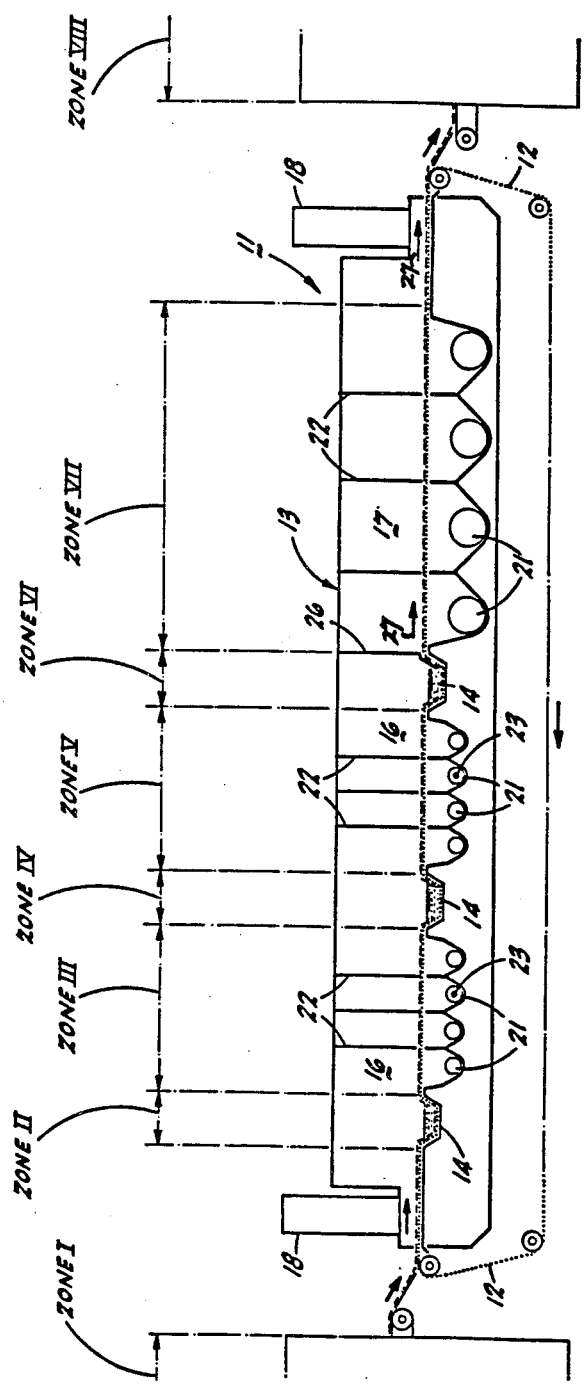

APPARATUS FOR PREPARING FRENCH FRIED POTATOES

This application is a division of our prior application, Ser. No. 013,461 originally filed on Feb. 21, 1979, and now U.S. Pat. No. 4,269,861, which issued on May 26, 1981.

BACKGROUND OF THE INVENTION

This invention relates to a process for preparing french fried potato strips for freezing and subsequent finish frying or oven reconstitution, and specifically to a process giving a pre-fried potato product with low oil content.

Frozen, pre-fried strips of potatoes have received substantial commercial acceptance and consumers of french fried potatoes from retail fast food establishments may now prefer the pre-fried, frozen and later finish fried product to french fried potatoes prepared directly from fresh potatoes. In no small measure this change in consumer acceptance can be attributed to the french fried potato product marketed by McDonald's System, Inc. That company is the assignee of U.S. patent to Strong U.S. Pat. No. 3,397,993, for a process for preparing frozen french fried potato segments. There the potatoes after the preliminary steps of peeling, trimming, cutting and washing were blanched in hot water or steam to translucency, then dehydrated for a product weight loss of about 30 to 35%, fried in an oil bath for 15 to 60 seconds then frozen. After delivery to the retail establishment, the frozen french fries were finish fried in hot oil at 300° F. to 375° F. for about 1½ to 3½ minutes, salted and served. The pre-frying stages of blanching the hydrating and frying in that process consume on the order of 9 to 30 minutes, best results being specified in the 15 to 20 minute range. There is no disclosure in that patent of controlling oil pick-up in the pre-frying stages.

The U.S. patent to Wilder U.S. Pat. No. 3,649,305, issued Mar. 14, 1972, disclosed a sequences of steps for preparing french fried potatoes with a color preservation step following the preliminary preparation steps. This was followed by dehydration of the french fried slices to reduce their gross weight from about 10 to 30%, followed by blanching with steam. Then the potatoes were fried in deep fat for a 30 to 90 second period. Then the french fried potato strips were frozen for finish frying in a retail establishment or the like. The dehydration, blanching, deep frying and oil treatment steps disclosed consumed about 16 minutes.

The Canadian Pat. No. 900,266, to Saunders issued May 16, 1972, disclosed a french fried potato pre-frying process which, following the preliminary steps, provided a oil frying treatment step for a 30 to 90 second period at 250° to 375° F. This was followed by a dehydration step using air at 150° to 350° F. moving at 550 feet per minute for a period on the order of 9 minutes. Then followed a second oil frying step for a 30 to 90 second period. The overall effect was to reduce the weight of the french fried potato product from about 5% to about 20% of the weight of the original strips and to cause a concentration of solids on the surfaces for improved surface texture.

These prior art processes for preparing french fried potato strips gave a product containing from 8 to 10% of oil before finish frying after which, the oil content would fall in the 14 to 20% range.

The present invention concerns itself with a process for preparing french fried potatoes for freezing and subsequent final frying or oven reconstitution, which have a substantially lesser oil content of under 8% and in the favored range of from 3 to 6%. The processing time is relatively rapid, on the order of 8 to 11 minutes. Elimination of the water or steam blanching step and the associated problems of treatment of starch contaminated water is one of the advantages.

SUMMARY AND OBJECTS OF THE INVENTION

The invention relates generally to a process for preparing french fried potatoes which may be frozen and later finished fried or oven reconstituted. The potatoes are first given the preliminary treatment steps of peeling, trimming and cutting into french fry size strips. Then they are washed. The french fried strips are immersed in a hot oil bath at about 250° F. to 350° F. for a time period on the order of 15 to 35 seconds and in this time effect a weight increase of about 2 to 5%. The strips are then exposed to a hot, moist, fast moving process vapor with a moisture content of between to 60 to 65% at a temperature of between 300° F. to 400° F. for a time period on the order of 1½ to 3½ minutes. The potato strips are again treated with oil and again subjected to the hot, moist atmosphere after which they are again treated with oil. Then the potato strips are exposed to a hot, fast moving dry atmosphere with a temperature of about 300° F. to 400° F. for about 3 to about 6 minutes so as to reduce the moisture content of the potato strips about 23 to about 31% and to give an oil content on the order of 3 to 7%. The potato strips may then be frozen and packaged for later finish frying.

An important object of the invention is to provide an improved process to produce a pre-fried french fried potato product having a low oil content.

Another object of the invention is to provide a process for making pre-fried french fried potatoes which is rapid and by which the moisture content of the pre-fried potatoes product is reduced in weight about 23 or more percent while retaining the flavor and crusty exterior in the subsequent finish fried potato.

Another object of the invention is to provide a continuous process for producing a french fried potato wherein the pre-frying process steps may be carried out within the confines of a single piece of equipment and wherein all tumbling and transferring of the product are avoided, thus minimizing greatly loss of product from transferring operations.

Another object of the invention is to provide a process for preparing pre-fried potato products in which the likelihood of oil degradation in later storage is reduced. It is well known in the industry that the use of cooking oil with a low percentage of free fatty acids results in better shelf life of the product. When the oil is exposed to high temperatures and air the free fatty acid level goes up. Fresh oil introduced to make up what is carried out with the product has a very low acid level. Because of the low oil volume in the system the turnover rate is extremely fast, so a low acid level is maintained.

Another object is to provide an apparatus for carrying out the process as outlined above in a continuous manner and without the need of transferring the potato slices during treatment to other equipment.

These and other objects of the invention will appear from the following description in which an illustrated embodiment has been set forth in detail in conjunction with the accompanying drawings.

BRIEF DESCRIPTION OF THE DRAWINGS

FIG. 1 is a flow sheet illustrating the general method of carrying out our process for preparing french fried potatoes; and FIG. 2 is a schematic representation of a system of apparatus which is useful in carrying out our continuous process for preparing pre-fried french fried potatoes.

GENERAL STATEMENT OF THE INVENTION

Generally stated, our new process begins after the conventional preliminary preparation is given the potatoes. This includes the steps of potato peeling, trimming, sorting and cutting the potatoes into french fry sized strips. Numerous configurations of product may be processed varying in size, shape and cross section as commonly processed in the potato french fry industry. The strips are then thoroughly washed to remove the free starch remaining on the surface and also to remove any potato cells severed during the cutting operation. The sugar content of the potato strips may be adjusted at this point in the process by methods well known in this field.

In any event, the potato strips are drained to eliminate any excessive surface moisture before they are introduced into the first oil treatment step. More particularly, the potato strips are immersed in a bath of suitable edible frying oil for about 2 seconds to about 25 seconds to impart a surface treatment to the potato strips for picking up oil necessary to this product. The weight increase in this step is on the order of 2 to about 6%. The temperature of the oil bath is from 235° F. to 275° F. Preferably the strips may be treated in the oil bath for about 20 seconds at a temperature of about 250° F., where the very best results were obtained.

The thus treated french fried potato strips are then subjected to a rapidly moving, moist, hot process vapor, one having a moisture content of about 60 to 65%. The temperature is from 300° F. to 400° F. The treatment time in this step is about 2 minutes and this reduces the weight of the product about 6 to about 11%. These two steps give a set to the exterior of the potato slices by the combined action of the hot oil and the hot moist vapor.

The second oil treatment step is then imparted to the product under similar conditions as with the first treatment step above. The second oil treatment step is followed by a second exposure of the french fried potato strips to the hot moist process vapor. A subsequent step of oil treatment is imparted to the product under similar conditions as in the first two oil treatment steps.

The final step in the process is exposing the french fried potato product to a hot, relatively dry atmosphere for about 4 minutes at 350° F. dry bulb temperature with vapor flow on the order of 1500 feet per minute. In this stage the product weight is reduced to its final treatment weight, losing about 22 to 31% weight overall. The oil accumulation in the product through these sequences of steps is generally below 7% which is desirable in the industry where an acceptable oil content is between 8 and 10%.

The french fried strips are then subjected to freezing by any of the known methods including placing the strips in a blast of cold air, plate freezing, or placing them in a liquid nitrogen or similar product. The french fried potato strips may then be packaged for finish frying later.

When the frozen product is prepared for final use, such as at a retail food outlet, the french fried potato strips are preferably immersed in suitable frying oil for abut 1½ to 3 minutes, the oil being at a temperature from about 325° F. to 375° F. A preferred time for such finish frying is 2¼ minutes in oil about 350° F. The final product is golden in color, crunchy in taste with a center closely resembling that of a baked potato and is of a quality widely accepted by the consuming public as standard or better.

In certain instances it may be desirable in the present invention to omit immersing the french fried strips in hot oil and substitute a hot oil treatment of the strips through a curtain or spray of hot oil to achieve the desired oil pick-up on the potato product before subjecting the product to the hot atmosphere.

DETAILED DESCRIPTION OF THE INVENTION

Referring to the drawings, FIG. 1 represents a general flow sheet of our new continuous process for preparing french fry potatoes and particularly illustrates the main steps of the entire process in the sequence.

Step 1 generally designates the preliminary treatment given to potatoes in the preparation of french fried potatoes and this includes cleaning and peeling the potatoes as by abrasion, steam, lye or other means well known in the field. The potatoes are then trimmed of blemishes and cut either in a crinkle or a conventional square cut. The usual size of the cut is from ¼" to ½" square in cross-section. The elongated strips are then washed free of surface starch to minimize adhesion to each other as they are processed. The washing is accomplished by fluming, barrel washing or any other conventional expedient for this purpose. After washing they are drained by conventional means to reduce the surface moisture and it has been found that in this washing and draining procedure the potato slices pick-up weight, nevertheless, between 2 to 3% from their original sliced weight. The temperature of the potato slices at the end of the preliminary steps may fall in the range of from 40° F. to as much as 150° F. depending upon the temperature of the wash water used.

In Step 2, the french fried potato slices are submerged in a bath of hot, edible frying oil which ideally is at a temperature of 250° F. but may range from 235° F. to 350° F. In this initial heat treatment step the potato slices are held ideally for 20 seconds but the period may be reduced to as much as 2 seconds or as long as 35 seconds. In this step the potato slices receive an initial surface treatment from contact with the hot oil and reach a pale yellow color while increasing weight from oil pick-up on the order of 2 to about 5%. Oil is necessary to the flavor and texture of french fried potato product as the consuming public has come to expect. However, reduction of oil in pre-fried french fried potato product is desirable from the standpoint of lowering oil costs.

In Step 2 a slight boiling of the oil on the surface of the potato slices may be observed.

In Step 3, the strips of french fried potato treated with oil are subjected to the action of a heated process vapor which effects a slight weight loss in the product of both water and oil. We have found that placing the potato slices on a wire mesh belt in a tunnel with a 1500 foot per minute vapor flow for 2 minutes results in a product weight loss of from 5 to about 11%. The temperature which is most effective is 300° F. and created by electrical resistance heating units sometimes called cal-rods. Other means of a heat source may be used. Live steam is introduced into the treatment tunnel and circulating fans propel the process vapor with respect to the wire mesh belt so that the potato strips are contacted on virtually all surfaces by the moist process vapor. The moisture content and the temperature are each controllable as disclosed in the Caridis and Benson U.S. Pat. No. 3,947,241 granted Mar. 30, 1976. The hot moist process atmosphere further conditions the surfaces of the potato slices, cooks the interior while inhibiting rapid dehydration of the slices.

In Step 4, the potato slices are treated in one mode of the invention as they were in Step 2 and there has been observed here an oil pick-up by the potato slices of a somewhat smaller percentage then was observed for Step 2. An alternative mode of subjecting the potato slices to oil treatment is by passing them on the conveyor belt through a curtain of hot downwardly flowing oil or by spraying the potato slices with hot oil.

In Step 5, the potato slices are treated as they were in Step 3 above.

In Step 6, the potato slices are treated as they were in Steps 2 and 4 above for a final oil treatment of the potato slices. Alternatively, Step 6 may be omitted with the process proceeding directly from Step 5 to Step 7.

In Step 7, the potato slices are subjected to the action of a hot, dry process vapor which affects a substantial weight reduction of the product of both water and oil. Here the process vapor, without steam, is held between 300° F. and 400° F. with the treatment period lasting from 3 to about 6 minutes. The weight reduction here in this step is on the order of 20%.

The overall weight reduction of the potato slices throughout the Steps 2 through 7 of this process is on the order of 23% to 31%. The oil content of the potato slices upon completion of Step 7 is preferably below 5% but in the range of from 3 to 7%. In the prior art processes the oil content was from 8 to 12% with the associated high costs of the oil carried out with the product. The time for completing Steps 2 through 7 is about 9 minutes which is substantially less than comparative prior art processes.

In Step 8 the potato slices are treated in the conventional fashion to freezing, packaging, and cold storage for final delivery to the user who finish fries the product for about 1½ to 3 minutes in an oil bath at temperatures from 300° F. to 350° F. The resulting product has a flavor associated with french fried potatoes prepared directly from fresh potatoes stock and a uniform golden appearance even with changes in the raw material potato product introduced in Step 1. The original taste of potatoes is largely preserved as has become associated with the french fry potato products. To prevent or reduce process oil degradation it may be desirable to introduce an inert atmosphere. A prepared inert gas such as nitrogen may be used. Or, the products of combustion from a burner which may be used either in conjunction with, or in lieu of, the electrical heating element.

EXAMPLE 1

Russet Burbank potatoes were peeled, trimmed, and cut into ¼" square cross-section french fry potato strips using a cutter employed in the restaurant trade. The strips were then washed to remove free starch from the surfaces and were drained to remove free moisture.

The strips were then immersed in a hot oil bath at 250° F. for 20 seconds and their weight increased 2% from the drained weight. They were next introduced into a fast moving hot, moist, process vapor for 2 minutes at 300° F. The process vapor had a 63% moisture content and its velocity was 1500 feet per minute. The process vapor was generated in an oven unit constructed on the principles disclosed in the Caridis et al. U.S. Pat. No. 3,947,241 wherein an open mesh wire conveyor belt supported the potato strips, electrical resistance heating being employed with steam to achieve the 300° F., 63% moisture content process vapor. The potato slices which had a raw weight following cutting of 326.5 grams, a washed weight of 335.9 grams, after being removed from the first pass of the process vapor weighed 318.9 grams which represents a loss of 7.1%. This is a loss of both the oil picked up in the first oil treatment as well as moisture lost from the potato product.

The french fried potato slices were again dipped in hot oil at 250° F. for 20 seconds and were weighed, an oil pick up of 1.6% being observed. Again the potato slices were introduced to the hot moist process vapor for 2 minutes after which they were weighed and a further 8.8% weight loss observed. For a third time the potato slices were dipped in hot oil at 250° F. for 20 seconds. Thereafter they were introduced into a hot, dry fast moving (1500 feet per minute) process vapor at 350° F., with no steam, for a period of 4 minutes. The total loss of weight of the potato slices following treatment was 29.8% and the potato product had a moisture content of 65%. The oil content of the product was found to be 4.03%. The process treatment steps as above totaled 9 minutes.

Thereafter the potato slices were frozen to 0° F. and later they were finished fried in a hot oil bath for 2½ minutes at 350° F. and their appearance was golden brown without moddling or dark spots and with superior texture, taste and crustiness.

EXAMPLE 2

A batch of Russet Burbank potatoes were peeled, trimmed and cut to ¼" square cross-section size in an conventional restaurant type potato slicer. The potatoes were washed to remove free starch and shaken in a wire mesh basket to remove excess water. After cutting, the batch weight was 385 grams and after washing the batch weight was 397.7 grams. The french fried slices in the wire mesh basket were lowered into an oil dip for 20 seconds at 250° F. and thereafter weighed to observe a 3.1% increase due to weight of the oil on the product. The potato slices, as in Example 1 above, were then placed on a wire mesh moving conveyor belt and carried through a hot, moist fast moving process vapor for 2 minutes at 300° F. at 63% moisture content. A 6.8% weight loss was observed upon completion of that step.

Then the french fried slices were exposed to a dip in an oil bath for 5 seconds at 250° F. and weighed to observe a weight increase of 2.9%. Sliced potatoes were again introduced into the hot moist process vapor for 2 minutes, then weighed to observe a weight loss of 7.7%. A third exposure to the hot oil was made for 5 seconds with only a 0.9% weight gain observed. Then as in Example 1, the french fried potatoe slices were introduced into a hot, relatively dry (no steam) process vapor at 350° F. for 4 minutes. Weighing at the end of this step revealed a total loss of product and oil pick up weight of 27.2%. Moisture content of the potato slices was 68% and oil content was 3.93%.

Thereafter the potato slices were frozen to 0° F. and later finished fried in hot oil as above. The product had an excellent color, taste and overall appearance.

EXAMPLE 3

Fresh raw potatoes of the Russet Burbank variety were peeled, trimmed and cut into ¼" french fry shapes with a restaurant type cutter. The batch to be processed was weighed at 477 grams and after washing to remove starch cells and the like found to weigh 490 grams. The french fry slices were then placed in an open mesh wire basket and dipped for 2 seconds in hot oil at 300° F. A 4.3% weight gain was observed from this exposure to the oil bath. Then as in Examples 1 and 2 the french fry slices were introduced into the hot, moist, fast moving process vapor for 2 minutes at 300° F. with 63% moisture. A 7.3% weight loss was observed by weighing following this process step. The potato strips were again exposed for 2 seconds to the hot oil bath at 300° F. and observed to increase their weight by 3.7%. Again the batch of potato slices was introduced into the hot, moist, rapid moving process vapor for 2 minutes at 300° F., losing 8.6% weight in this step. The batch of potato strips was again exposed to the hot oil dip for 2 seconds at 300° F. with an observed weight increase of 1.4%. Thereafter the batch was exposed for 4 minutes to a fast moving, dry (no steam) process vapor at 350° F. The product was weighed at the end of this step and found to have experienced a total loss of 26.2% with moisture content of the potato slices at 69.2% and oil content at 5.04%. The total time of exposure to the hot oil was 6 seconds. The total time of process treatment in these steps was under 9 minutes.

The potato slices were frozen 0° F. and later finished fried in hot oil as above. They had a crustiness and texture without moddling or black steaks and had a good golden color and good taste.

FIG. 2 schematically illustrates apparatus for carrying out our continuous process for preparing french fried potato strips and additionally illustrates certain refinements in the processing to achieve a most efficient development of desired characteristics in appearance, oil content, moisture content and processing times. As previously indicated the processing of french fried potato strips is initiated in the preliminary steps of peeling, trimming, cutting and washing and draining and in FIG. 2 this is symbolised as Zone I. The Zones designated in FIG. 2 relate by their Roman numerals to the Steps described above and as marked in FIG. 1 so that Step 1 is represented in FIG. 2 by Zone I, Step 2 by Zone II, etc.

The apparatus 11 of FIG. 2 is a development from the principles disclosed in the above mentioned Caridis and Benson U.S. patent. The processing apparatus 11 includes a single, continuous conveyor belt 12 of open wire mesh construction, an enclosing hood 13, the oil treatment modules 14, and the process vapor generating modules 16 and 17.

The hood 13 of the unit which encloses Zones II through VII is equipped with positive draft exhaust stacks 18 and suitable baffling to create a draft up the stack both from the ambient outside atmosphere and from the process vapor within the unit and thereby to substantially reduce the amount of air entrained into the processing vapor in the apparatus 11.

The oil treatment modules 14 of Zones II, IV and VI comprise a reservoir for oil having a length related to the desired treatment time and conveyor speed and this relationship is applied to the other processing modules as well because the conveyor transverses them all. The oil treatment module 14 has a separate temperature control unit well known in this field and an oil make-up facility of conventional arrangement. The conveyor belt 12 is equipped at its margins with drive chain so that spockets (not shown) may positively direct the conveyor belt downwardly, across and upwardly from the oil treatment reservoir for carrying the sliced potatoes into the next treatment zone.

The process vapor treatment Zones III, V and VII use modules 16 and 17. Each has a plurality of squirrel-cage type fans 21 which serve to direct the flow of process vapor upwardly through the conveyor belt 12. Electrical resistance heating units 22 are arranged in each of the modules 16 and 17 and are provided with control means for regulating the temperature within each module. Gas or oil burners or steam coils or other means may be used to supply heat instead of the electrical heating units.

In the two process modules 16 for Zones III and V there are arranged steam injectors 23 for supplying stem within the modules so as to realize a desired high moisture content from 60 to 65%. A baffle arrangement 26 extends between the module 17 and the adjacent module 16 so that a dryer atmosphere, without steam, may be maintained in the final treatment module 17, Zone VII. Inert gas may be introduced to reduce oil degradation. The baffle 26 may extend from the hood down into the oil reservoir terminated just above the conveyor belt 12.

Product flow through the Zones is in the direction of the arrow 27. Satisfactory speed of the process vapor is on the order of 1500 feet per minute in each Zone III, V, and VII and can vary depending on the depth of product on the conveyor belt.

Control means as disclosed in the above Caridis and Benson U.S. patent permits regulation of the moisture content and temperature in the modules 16 and 17.

Sliced potatoes treated in Zone I, FIG. 2, are deposited on the conveyor belt 12 and are carried into Zone II of the apparatus 11, there to be treated with the hot oil in the reservoir 14. The dimension of the reservoir and the belt speed is related to effect the desired treatment time. The conveyor belt 12 next carries the potato slices into Zone III for the treatment as described above in connection with Step 3. The steam delivered to the treatment module 16 through the steam injectors 23 is circulated by the squirrel-cage fans 21 upwardly through the conveyor belt 16 and through and around the potato slices. Temperature is maintained within the modules 16 by the cal-rod heaters 22 so that the potato slices as they traverse the module 16 on the belt will be subjected to the hot, moist, fast moving process vapor.

The potato slices are next carried by the conveyor belt 12 into Zone IV where they are treated as described above in connection with Step 4. Thereafter the conveyor belt 12 carries the potato slices through Zone V where the potato slices can be treated similarly as they were in Step 3 or to a varying temperature or moisture content should this be desired and the baffles (not shown) provided.

The potato slices are next conveyed by the conveyor belt 12 through the oil treatment module of Zone VI and passed therefrom, traversing under the baffle means 26 into the next treatment Zone VII where the treatment is imparted to the potato slices as described above in connection with Step 7. In module 17 the process vapor is relatively dry, no steam or less steam being injected and the temperature is somewhat higher than in the process Zone III and V. Preferably the temperature differential is on the order of 50° and 75° F. This effects a drying of the oil treated potato slices which then emerge from the treatment Zone VII into the final processing steps of Zone VIII. These are as described above in connection with Step 8.

Many variations are possible in the process described here and in the use of the exemplary apparatus disclosed. For example, while the multizone heating unit described achieves product conveying without any product transfer or tumbling, it is contemplated that several steps of the process may each be achieved by separate piece of apparatus, should it be desired. It may be desirable in some instances to carry out the oil treatment of the potatoes in only a single or double treatment and not in the triple treatment as disclosed herein. In like fashion, it may be desirable to raise the temperature in the process vapor treatment modules 16 and 17 or to vary the moisture content from that disclosed. Accordingly, it should be understood that the disclosures herein are intended to be purely illustrative and not in any sense limiting.

What is claimed is:

1. In apparatus for preparing french fried potatoes wherein pre-fried french fried potatoes are obtained with low oil content, the combination of: means forming a treatment chamber of appreciable length, conveyor means extending continuously through said treatment chamber serving to carry french fried potato slices there through for process treatment, said conveyor means being of open, wire-mesh construction, means in said treatment chamber defining a treatment zone of a first type serving to treat all surfaces of the potato slices in a supply of hot oil, means in said treatment chamber defining a treatment zone of a second type, said second type treatment zone having therein steam injection means, heating means, and fan means coacting with said heating means and steam injection means for circulating a hot, moist process vapor in said treatment zone through said conveyor; said treatment chamber having a plurality of each said first and second types of treatment zones; and means in said chamber permitting one of said second type of treatment zones to establish and maintain a different temperature and moisture content level from the next adjacent treatment zone permitting variations in temperature and moisture ranges between adjacent treatment zones.

2. Apparatus as in claim 1 wherein said treatment zone of the first type includes reservoir means serving to hold a supply of hot oil, said conveyor means extending through said reservoir means for carrying potato slices there through for treatment.

3. Apparatus as in claim 1 wherein at least one of said treatment zones of the first type includes means arranged over said conveyor means permitting a curtain of hot oil to flow therefrom onto the conveyor means and the potato slices thereon.

4. Apparatus as in claim 1 wherein said apparatus includes at least three treatment zones of the first type and at least two treatment zones of said second type; and including a third type of treatment zone having means therein for creating and circulating a hot, relatively dry process vapor through said conveyor means.

* * * * *